(12) United States Patent
Moldenhauer et al.

(10) Patent No.: US 11,909,186 B2
(45) Date of Patent: Feb. 20, 2024

(54) COIL SPRING CASSETTE

(71) Applicant: KOSTAL Automobil Elektrik GmbH & Co. KG, Luedenscheid (DE)

(72) Inventors: Knut Moldenhauer, Hagen (DE); Raphael Kleine, Bochum (DE)

(73) Assignee: Kostal Automobil Elektrik GmbH & Co. KG, Luedenscheid (DE)

(*) Notice: Subject to any disclaimer, the term of this patent is extended or adjusted under 35 U.S.C. 154(b) by 443 days.

(21) Appl. No.: 17/386,647

(22) Filed: Jul. 28, 2021

(65) Prior Publication Data
US 2021/0359502 A1 Nov. 18, 2021

Related U.S. Application Data

(63) Continuation of application No. PCT/EP2020/054444, filed on Feb. 20, 2020.

(30) Foreign Application Priority Data

Feb. 23, 2019 (DE) ............... 10 2019 001 311.5

(51) Int. Cl.
H01R 39/00 (2006.01)
H02G 11/00 (2006.01)
B60R 16/027 (2006.01)
H02K 3/46 (2006.01)

(52) U.S. Cl.
CPC ......... *H02G 11/006* (2013.01); *B60R 16/027* (2013.01); *H02K 3/46* (2013.01)

(58) Field of Classification Search
CPC ....... H02G 11/006; H02K 3/46; B60R 16/027

USPC .......................................... 439/15
See application file for complete search history.

(56) References Cited

U.S. PATENT DOCUMENTS

| 6,595,452 | B1 | 7/2003 | Berthaud et al. |
| 7,018,223 | B2* | 3/2006 | Kober ............... H01R 35/025 |
| | | | 439/38 |
| 2012/0126047 | A1 | 5/2012 | Skowronski et al. |
| 2014/0263801 | A1 | 9/2014 | Skowronski |

FOREIGN PATENT DOCUMENTS

| DE | 4121284 A1 | 11/1992 |
| JP | 4518354 B2 | 8/2010 |

OTHER PUBLICATIONS

European Patent Office, International Search Report for International Application No. PCT/EP2020/054444, dated Apr. 1, 2020.
The International Bureau of WIPO, International Preliminary Report on Patentability for International Application No. PCT/EP2020/054444, dated Aug. 10, 2021.

* cited by examiner

*Primary Examiner* — Phuong K Dinh
(74) *Attorney, Agent, or Firm* — Brooks Kushman P.C.

(57) ABSTRACT

A coil spring cassette includes a stator housing part and a rotor housing part that is rotatable relative to the stator housing part about a longitudinal axis. The stator housing part and the rotor housing part together form therebetween a first chamber and a second chamber at respective positions along the longitudinal axis. A first flat cable with a reversal of winding direction is arranged in the first chamber. A second flat cable with a uniform winding direction is arranged in the second chamber.

20 Claims, 1 Drawing Sheet

COIL SPRING CASSETTE

CROSS-REFERENCE TO RELATED APPLICATIONS

This application is a continuation of International Application No. PCT/EP2020/054444, published in German, with an International filing date of Feb. 20, 2020, which claims priority to DE 10 2019 001 311.5, filed Feb. 23, 2019, the disclosures of which are hereby incorporated in their entirety by reference herein.

TECHNICAL FIELD

The present invention relates to a coil spring cassette having a cylindrical stator housing part and a cylindrical rotor housing part, the housing parts being coaxially arranged about a common longitudinal axis with the rotor housing part being situated circumferentially inward with respect to the stator housing part whereby the rotor housing part is an internal housing part and the stator housing part is an external housing part, the stator housing part being stationary and the rotor housing part being rotatable relative to the stator housing part about the common longitudinal axis, wherein an outer lateral surface of the internal housing part and an inner lateral surface of the external housing part delimit a chamber formed therebetween, and at least one flexible flat cable having electrical conductors is situated in the chamber.

BACKGROUND

Coil spring cassettes are used to establish electrical connections between two objects, one of which is situated so as to be rotatable with respect to the other object. For this purpose, coil spring cassettes have a stator housing part and a rotor housing part between which at least one flat cable is situated. The flat cable is arranged in multiple layers in the so-called winding gap between the housing parts. First and second ends of the flat cable are mechanically and electrically connected to the stator housing part and to the rotor housing part, respectively. During a rotational movement of the rotor housing part relative to the stator housing part, the flat cable moves inside the winding gap in correspondence with the rotational movement of the rotor housing part.

Various arrangements of a flat cable in the winding gap of a coil spring cassette are known, which may essentially be reduced to two basic forms. The first basic form provides a spiral-shaped arrangement of the flat cable ("clock spring principle") having a uniform winding direction. The second basic form provides a reversal of the winding direction in which the flat cable has a U-shaped inflection point ("U-turn principle"), which shifts or changes inside the winding gap during rotation of the rotor housing part.

Arrangements according to the U-turn principle have become widely established due to the fact that they have several advantages compared to arrangements according to the clock spring principle. Thus, for the same intended rotation distance of the rotor housing part, the U-turn principle allows use of a much shorter flat cable. In addition, up to approximately eight separate flat cables can extend circumferentially in the same winding gap for U-turn arrangements, compared to a maximum of two flat cables for clock spring arrangements. This allows a significantly larger number of electrical connections between the rotor housing part and the stator housing part, as well as a relatively small installation size of the coil spring cassette. Furthermore, coil spring cassettes according to the U-turn principle are characterized by lower noise levels than comparable coil spring cassettes having flat cables arranged in a spiral shape.

In modern motor vehicles there is an ever-increasing need for high-speed data transmission (Ethernet, LVDS) to the steering wheel. The steering wheel is mechanically connected to the rotor housing part whereby the rotor housing part rotates relative to the stator housing part in correspondence with rotation of the steering wheel. Flat cables that are suitable for high-speed data transmission have, for example, a full-surface metal coating, as a so-called coupling surface, on one side. These comparatively thick flat cables, necessary for the high-speed data transmission, are not usable in coil spring cassettes according to the U-turn principle without causing problems, since relatively small bending radii are required.

Similar problems result when relatively high electrical currents are to be transmitted via a flat cable. The cores of a flat cable capable of transmitting high electrical currents have a relatively large cross section and are thus rigid.

In these cases, an arrangement of the flat cable according to the clock spring principle is advantageous, since significantly larger bending radii are thus possible. However, for many other applications, the above-mentioned advantages of a U-turn arrangement are thereby lost.

SUMMARY

An object is to provide a coil spring cassette that combines the advantages of the arrangement of flat cables according to the U-turn principle and the advantages of the arrangement of flat cables according to the clock spring principle.

Embodiments of the present invention provide a coil spring cassette having a cylindrical stator housing part and a cylindrical rotor housing part. The stator housing part and the rotor housing part are coaxially arranged about a common longitudinal axis with the rotor housing part being situated circumferentially inward with respect to the stator housing part and with the rotor housing part being rotatable relative to the stator housing part about the common longitudinal axis. An outer surface of the rotor housing part and an inner surface of the stator housing part delimit a top chamber formed therebetween and a bottom chamber formed therebetween. At least, one first flat cable is arranged with reversal of the winding direction in the top chamber. At least one second flat cable is arranged with a uniform winding direction in the bottom chamber.

In carrying out at least one of the above and/or other objects, a coil spring cassette is provided. The coil spring cassette includes a stator housing part and a rotor housing part that is rotatable relative to the stator housing part about a longitudinal axis. The stator housing part and the rotor housing part form therebetween a first chamber and a second chamber at respective positions along the longitudinal axis. A first flat cable with a reversal of the winding direction is situated in the first chamber and a second flat cable with a uniform winding direction is situated in the second chamber.

Further, in carrying out at least one of the above and/or other objects, an assembly for a vehicle is provided. The assembly includes a stator housing part and a rotor housing part. The stator housing part is mechanically connectable to stationary elements of a steering column of the vehicle. The rotor housing part is rotatable relative to the stator housing part about a longitudinal axis. The rotor housing part is mechanically connectable to a steering wheel of the vehicle whereby the rotor housing part is rotatable relative to the stator housing part about the common longitudinal axis in correspondence with rotary actions of the steering wheel. The housing parts together form therebetween a first chamber and a second chamber at respective positions along the longitudinal axis. A first flat cable with a reversal of winding direction is arranged in the first chamber. A second flat cable with a uniform winding direction is arranged in the second chamber. The second flat cable may be provided for high-speed data transmission to the steering wheel.

In embodiments of the present invention, the coil spring cassette forms a first chamber and a second chamber that are closed off with respect to one another and that are arranged parallel in relation to one another along their longitudinal axis. The first chamber is thus on one side (e.g., the top side) of the coil spring cassette and the second chamber is thus on the other side (e.g., the bottom side) of the coil spring cassette. At least one (relatively thin) flat cable is arranged with reversal of the winding direction in the first chamber. At least one (relatively thick) flat cable is arranged with a uniform winding direction in the second chamber.

By use of this approach, a high-speed data transmission to a steering wheel connected to the rotor housing part may be easily achieved via a (relatively thick) flat cable in a clock spring arrangement, while for other functions (for example, airbags or control of the entertainment system) the U-turn principle may continue to be advantageously used via a different (relatively thin) flat cable.

BRIEF DESCRIPTION OF THE DRAWINGS

An exemplary embodiment of the present invention is explained in greater detail below with reference to the drawings, which show the following.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
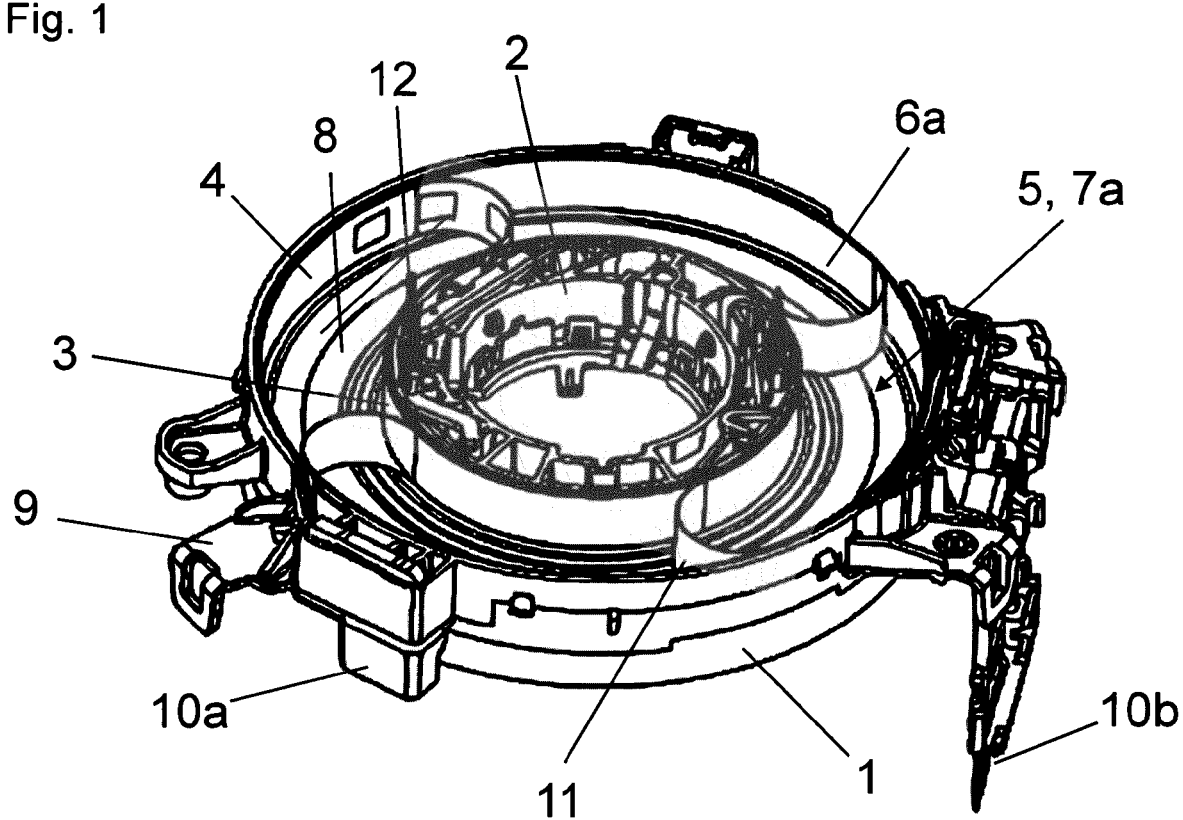
FIG. 1 illustrates a top side view of a coil spring cassette in accordance with embodiments of the present invention.
Figure 2:
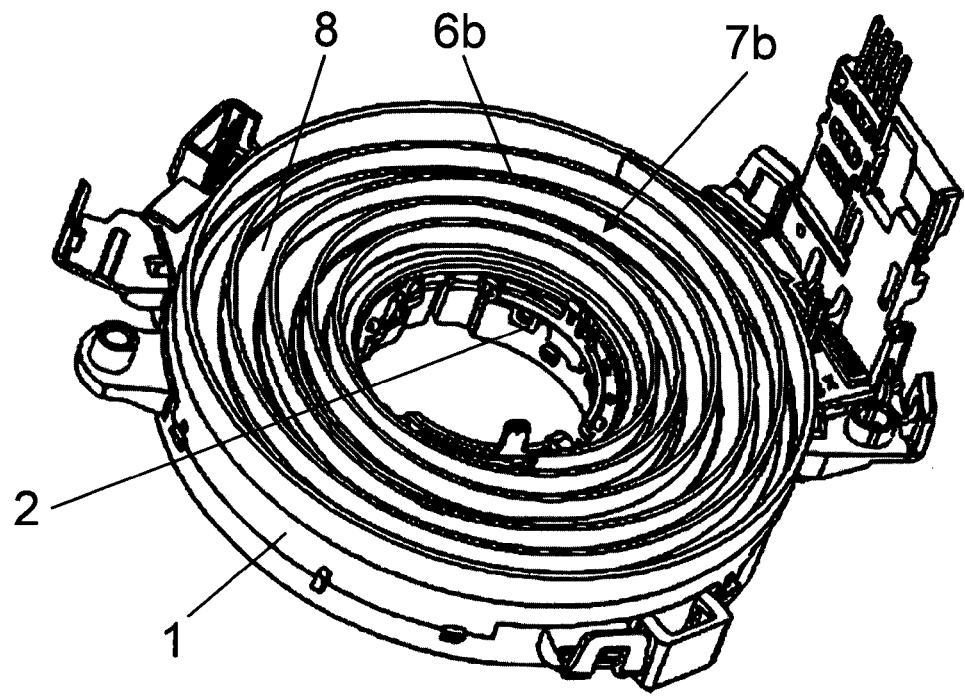
FIG. 2 illustrates a bottom side view of the coil spring cassette.

Referring now to FIGS. 1 and 2, a coil spring cassette in accordance with embodiments of the present invention is shown. FIG. 1 illustrates a top side view of the coil spring cassette and FIG. 2 illustrates a bottom side view of the coil spring cassette.

The coil spring cassette is made up of a stator housing part 1 and a rotor housing part 2. Stator housing part 1 is fixed in position and rotor housing part 2 is rotatable relative to stator housing part 1. In an application of the coil spring cassette, for example, stator housing part 1 is mechanically connected to stationary elements of the steering column of a motor vehicle and rotor housing part 2 is mechanically connected to the steering wheel of the motor vehicle. As such, in this exemplary application, rotor housing part 2 rotates relative to stator housing part 1 in correspondence with rotary actions of the steering wheel.

In the present exemplary case, stator housing part 1 is an external housing part and rotor housing part 2 is an internal housing part situated concentrically with respect to stator housing part 1. That is, stator housing part 1 and rotor housing part 2 are coaxially arranged about a common longitudinal axis with rotor housing part 2 is rotatable relative to stator housing part 1 about the common longitudinal axis and with rotor housing part 2 being situated circumferentially inward with respect to stator housing part 1 whereby rotor housing part 2 is the internal housing part and stator housing part 1 is the external housing part.

Four individual first flat cables 6a are discernible in FIG. 1. Each first flat cable 6a rests against both of an outer lateral surface 3 of rotor housing part 2 and an inner lateral surface 4 of stator housing part 1. When rotor housing part 2 rotates relative to stator housing part 1, first flat cables 6a roll off on rotor and stator lateral surfaces 3 and 4. At the transition between rotor and stator lateral surfaces 3 and 4, each first flat cable 6a reverses its winding direction, thus forming a reverse loop 11. Each reverse loop 11 moves through the space (i.e., the so-called winding gap 5) between rotor and stator lateral surfaces 3 and 4 during a relative rotation of rotor housing part 2.

A horizontal intermediate wall 8 that is part of stator housing part 1 and a cover part (not illustrated) that is connected to rotor housing part 2 supplement winding gap 5 to form a first chamber 7a in which first flat cables 6a are situated. Alternatively, intermediate wall 8 may be designed as a separate component.

Since winding gap 5 is relatively narrow, reverse loop 11 of each first flat cable 6a has a relatively small bending radius. Therefore, it is necessary for all of first flat cables 6a to be very flexible, and thus, to have a relatively thin design. First flat cables 6a are thus particularly suitable for low-frequency signal transmissions with low electrical current intensities.

When the coil spring cassette is also to be used for transmitting higher electrical current intensities or high-frequency data signals, this requires flat cables 6b that are significantly thicker, and thus more bend-resistant and less flexible. For this reason, such flat cables 6b are less suitable for an arrangement with a reversal of the winding direction, unless a significant increase in the size of the coil spring cassette is accepted.

The solution to this problem is illustrated in FIG. 2 and involves situating at least one fairly thick second flat cable 6b in a spiral-shaped arrangement, and thus in a uniform winding direction, on the rear side of horizontal intermediate wall 8.

For this purpose, inner lateral surface 4 of stator housing part 1 and outer lateral surface 3 of rotor housing part 2 together with the rear side of horizontal intermediate wall 8 form a second chamber 7b which accommodates second flat cable 6b.

The coil spring cassette thus contains a first flat cable 6a in a U-turn arrangement, and a second flat cable 6b in a clock spring arrangement, it being possible for the first and second flat cables 6a and 6b to have greatly differing properties. The coil spring cassette in accordance with embodiments of the present invention thus advantageously combines the beneficial properties of both designs.

Mechanical connecting elements 9 for fastening the coil spring cassette, in particular in a motor vehicle, are integrally formed on stator housing part 1. Also discernible on stator housing part 1 are electrical connecting elements 10a, 10b via which electrical signals may be fed into flat cables 6a, 6b.

Electrical connecting elements 12 are also part of rotor housing part 2.

LIST OF REFERENCE NUMERALS

1 stator housing part (external housing part)
2 rotor housing part (internal housing part)
3 outer lateral surface (outer jacket surface) of rotor housing part
4 inner lateral surface (inner jacket surface) of stator housing part
5 winding gap
6a first flat cable
6b second flat cable
7a first chamber
7b second chamber
8 horizontal intermediate wall (horizontal partition)
9 mechanical connecting elements (mechanical fasteners)
10a, 10b electrical connecting elements
11 reverse loop
12 electrical connecting elements (electrical connectors)

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A coil spring cassette comprising:
a stator housing part;
a rotor housing part that is rotatable relative to the stator housing part about a longitudinal axis;
the stator housing part and the rotor housing part together form therebetween a first chamber and a second chamber at respective positions along the longitudinal axis;
a first flat cable with a reversal of winding direction arranged in the first chamber; and
a second flat cable with a uniform winding direction arranged in the second chamber.

2. The coil spring cassette of claim 1 wherein:
the stator housing part includes an intermediate wall extending from a position along the longitudinal axis between the first chamber and the second chamber; and
the first chamber being on one side of the intermediate wall and the second chamber being on an opposite side of the intermediate wall.

3. The coil spring cassette of claim 1 wherein:
the first flat cable has a cross section that is thinner than a cross section of the second flat cable.

4. The coil spring cassette of claim 1 wherein:
the second flat cable is thicker than the first flat cable.

5. The coil spring cassette of claim 1 wherein:
the first flat cable is provided for transmitting relatively low electrical currents; and
the second flat cable is provided for transmitting relatively high electrical currents.

6. The coil spring cassette of claim 1 wherein:
the second flat cable is provided for transmitting high-frequency digital signals; and
the first flat cable is provided for transmitting at least some signals other than high-frequency digital signals.

7. The coil spring cassette of claim 1 wherein:
the stator housing part is a cylindrical stator housing part and the rotor housing part is a cylindrical rotor housing part.

8. The coil spring cassette of claim 1 wherein:
the stator housing part and the rotor housing part are coaxially arranged about the longitudinal axis.

9. The coil spring cassette of claim 8 wherein:
the rotor housing part is situated circumferentially inward with respect to the stator housing part.

10. The coil spring cassette of claim 1 wherein:
the stator housing part is mechanically connectable to stationary elements of a steering column of a vehicle and the rotor housing part is mechanically connectable to a steering wheel of the vehicle whereby the rotor housing part is rotatable relative to the stator housing part about the longitudinal axis in correspondence with rotary actions of the steering wheel.

11. A coil spring cassette comprising:
a cylindrical stator housing part;
a cylindrical rotor housing part;
the stator housing part and the rotor housing part being coaxially arranged about a common longitudinal axis with the rotor housing part being situated circumferentially inward with respect to the stator housing part and with the rotor housing part being rotatable relative to the stator housing part about the common longitudinal axis;
an outer surface of the rotor housing part and an inner surface of the stator housing part delimit a top chamber formed therebetween and a bottom chamber formed therebetween;
a first flat cable having a reversal of winding direction, the first flat cable being positioned in one of the top chamber and the bottom chamber; and
a second flat cable having a uniform winding direction, the second flat cable being positioned in the other one of the top chamber and the bottom chamber.

12. The coil spring cassette of claim 11 wherein:
the top chamber and the bottom chamber are closed off with respect to one another and are situated in parallel to one another along the common longitudinal axis.

13. The coil spring cassette of claim 11 wherein:
the stator housing part includes an intermediate wall which separates the top chamber and the bottom chamber from one another.

14. The coil spring cassette of claim 11 wherein:
the first flat cable has a cross section that is thinner than a cross section of the second flat cable.

15. The coil spring cassette of claim 11 wherein:
the second flat cable is thicker than the first flat cable.

16. The coil spring cassette of claim 11 wherein:
the second flat cable is provided for transmitting high-frequency digital signals.

17. The coil spring cassette of claim 11 wherein:
the second flat cable is provided for transmitting relatively high electrical currents.

18. The coil spring cassette of claim 11 wherein:
the stator housing part is mechanically connectable to stationary elements of a steering column of a vehicle and the rotor housing part is mechanically connectable to a steering wheel of the vehicle whereby the rotor housing part is rotatable relative to the stator housing part about the common longitudinal axis in correspondence with rotary actions of the steering wheel.

19. An assembly for a vehicle, comprising:
a stator housing part that is mechanically connectable to stationary elements of a steering column of the vehicle a rotor housing part that is rotatable relative to the stator housing part about a longitudinal axis, the rotor housing part being mechanically connectable to a steering wheel of the vehicle whereby the rotor housing part is rotatable relative to the stator housing part about the common longitudinal axis in correspondence with rotary actions of the steering wheel;

the stator housing part and the rotor housing part together form therebetween a first chamber and a second chamber at respective positions along the longitudinal axis;

a first flat cable with a reversal of winding direction arranged in the first chamber; and a second flat cable with a uniform winding direction arranged in the second chamber.

20. The assembly of claim 19 wherein:

the second flat cable is provided for high-speed data transmission to the steering wheel.

\* \* \* \* \*